United States Patent [19]

Balsano et al.

[11] Patent Number: 5,176,922
[45] Date of Patent: Jan. 5, 1993

[54] PRESS FOR MAKING PIZZA BEDS

[75] Inventors: Andrea Balsano, Mozzo; Enrico Schiaretti, Parma, both of Italy

[73] Assignee: Barilla G.E.R. F.lli-Societa per Azioni, Parma, Italy

[21] Appl. No.: 762,983

[22] Filed: Sep. 20, 1991

[51] Int. Cl.⁵ .............................................. B30B 7/00
[52] U.S. Cl. ....................................... 425/89; 100/237; 425/356; 425/398; 425/412; 425/417; 425/420; 426/502; 426/811
[58] Field of Search .......................... 100/61, 237, 295; 425/89, 356, 398, 406, 412, 417, 419, 420, 457, 472; 426/502, 517, 811

[56] References Cited
U.S. PATENT DOCUMENTS

| | | | |
|---|---|---|---|
| 992,632 | 5/1911 | Andrychewicz | 100/237 |
| 1,505,860 | 8/1924 | Byford | 425/89 |
| 2,449,008 | 9/1948 | Pecker et al. | 425/356 |
| 3,115,678 | 12/1963 | Keen et al. | 425/356 |
| 3,692,454 | 9/1972 | Kruger | 425/457 |
| 4,221,556 | 9/1980 | Kiss | 425/398 |
| 5,074,944 | 12/1991 | Trenka | 100/237 |
| 5,076,880 | 12/1991 | Spengler et al. | 425/419 |

Primary Examiner—Jay H. Woo
Assistant Examiner—Scott Bushey
Attorney, Agent, or Firm—Sughrue Mion Zinn Macpeak & Seas

[57] ABSTRACT

A press for making pizza beds includes a mold plug having a plurality of pressure rings fitting telescopically and being guided within one another. Double-acting cylinders sequentially actuate the rings from the innermost one to the outermost one to act on the dough such as to stretch it from its center radially outwardly.

2 Claims, 6 Drawing Sheets

PRESS FOR MAKING PIZZA BEDS

BACKGROUND OF THE INVENTION

This invention relates to a vertical press for making dough beds for pizzas and the like food products from correspondingly apportioned lumps of the dough.

It is known that to prepare pizza beds on a commercial or near-commercial scale, vertical presses have long been used whereby an apportioned amount of an edible dough is pressed within a substantially pan-shaped die into a conforming shape. Special care and arrangements are applied to provide the moving plug on the press with such a structure and speed of advance as to enable the viscoelastic dough to acquire its desired shape without developing shreds or material discontinuities.

One such press is described, for instance, in Italian Patent No. 1,117,739, which provides a method of forming pizza beds using mechanical presses equipped with a press platen incorporating electric resistance heaters operative to bring it up to a suitably set temperature.

Another technical approach is disclosed in U.S. Pat. No. 4,511,324, which stresses the importance of preparing a dough sheet having a peripheral bead that can prevent condiments and fillings from flowing off as the pizza is being baked. A press is provided for the purpose wherein the moving plug is basically a plate formed with a peripheral bevel set at a suitable inclination angle to the rim of the die.

A third approach, disclosed in U.S. Pat. No. 4,303,677, is based on the preparation of a dough sheet having an upturned peripheral edge using first and second pressing steps to be carried out under different presses, the moving plug of the second press being designed and operated such as to form the upturned peripheral edge with substantially the same thickness as the remainder of the pizza bed.

The above-referenced prior approaches, while substantially achieving their objective of producing pizza beds on a commercial or near-commercial scale, share the disadvantage that they are unsuited to process as appropriate a dough which be intended for making genuine Neapolitan pizza.

It should be emphasized in this respect that the dough for a genuine Neapolitan pizza requires a characteristic amount of moisture (in the 55% to 70% range) and typical settle and rise times under appropriate conditions of temperature and humidity. For example, the dough settling time would usually be within the range of three to sixteen hours in an environment at a temperature between 20° C. and 35° C., depending on the amount of yeast in the dough.

A first settling period with concurrent rising of the entire body of dough is followed by forming into plural lumps, each to provide essentially a preform for subsequent processing into a corresponding pizza bed.

After a second, shorter, rising period, which may last between 30 and 90 minutes, such preforms appear as portions of a very supple dough, which are then kneaded manually by the pizza maker, using a characteristic skill not to be easily acquired, into an ultimate disk of varying thickness, being quite thin (0.5 mm) in its central region and thicker (3–6 mm) in its outward region around a peripheral edge.

This "manual" processing, applied by the pizza maker in a characteristic fashion, would vary between operatives, but is in all cases aimed at having the dough kneaded by pulling it from the center of the pizza bed toward the periphery thereof, leaving the texture of its outward edge virtually unaffected. During the kneading, this edge would locate inwards of the pulling hand palm. The pull applied to the dough along radial directions (or away from center) causes the carbon dioxide released through the dough by peripheral edge of the pizza bed is allowed thereby.

The underlying technical problem of this invention is to provide a press for preparing pizza beds on a commercial or near-commercial scale, which has such structural and functional features as to subject the preform to a dough stretching action along directions radiating from its center, with said stretching action being effective to displace the dough out from the preform center, rather than to just squeeze it, thereby the carbon dioxide generated within the dough during rise can build up in the thicker bed rim.

SUMMARY OF THE INVENTION

This problem is solved according to the invention by a vertical press which comprises:

a mold plug including a plurality of pressure rings, being mounted to telescope inside one another in a guided fashion from a first position where their bottom ends lie coplanar and define a planar wall for said plug, to a second position where they are individually extended with respect to one another;

a means of driving said pressure rings individually in the vertical direction, and a cloth of a non-sticking material which does not stick to the dough employed for pizza beds, attached peripherally to the outermost pressure ring of said plug by spring-biased means and enclosing said plurality of pressure rings.

Advantageously, said pressure rings have a circular cross-sectional shape, and means is provided in said mold plug to prevent said pressure rings from rotating.

The features and advantages of a vertical press according to the invention will be apparent from the following detailed description of an embodiment thereof, to be read in conjunction with the accompanying illustrative, but not limitative, drawings.

DETAILED DESCRIPTION OF THE INVENTION

Figure 1:
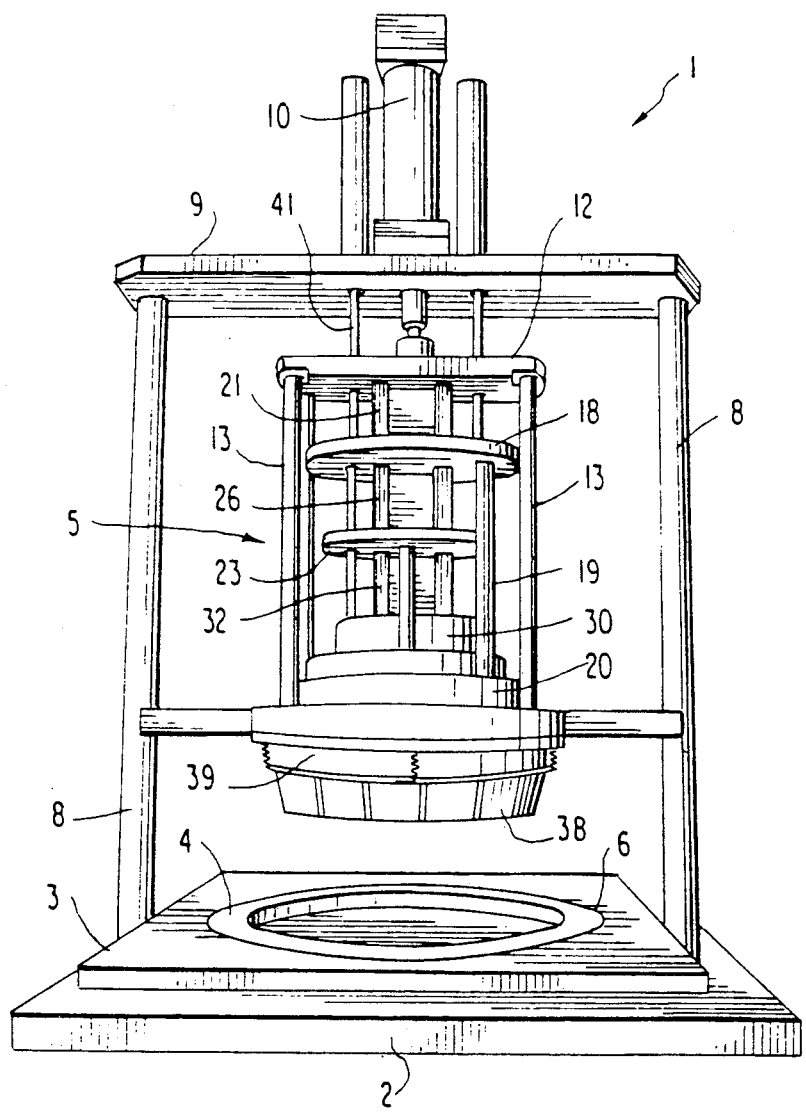
FIGS. 1 and 2 are front and top perspective views, respectively, of a vertical press according to the invention.
Figure 2:
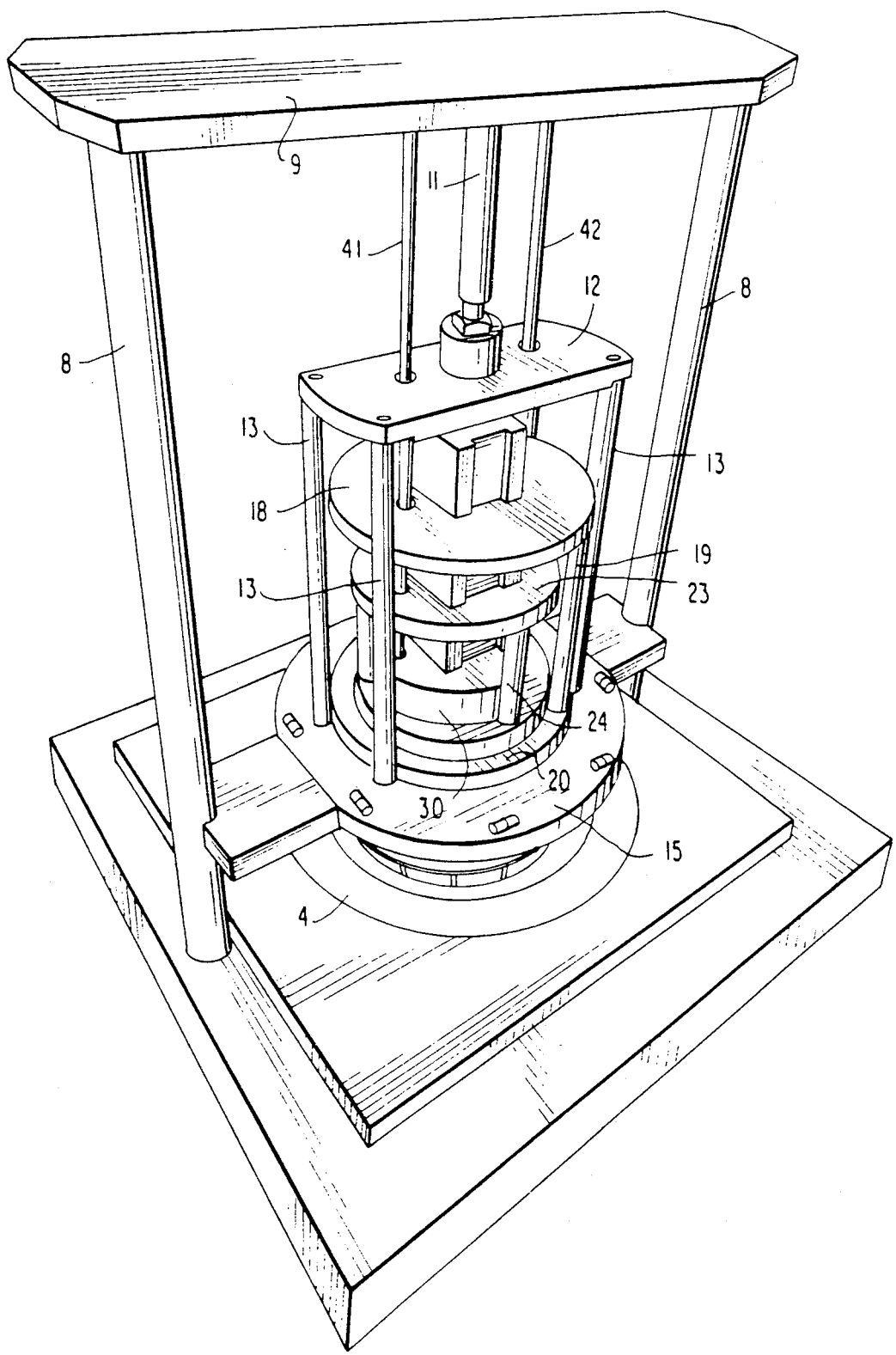

With reference to the drawing figures, generally shown at 1 is a press for preparing pizza beds in accordance with the invention, which comprises a machine base 2 having a worktable 3 attached thereto, the worktable supporting the mold die 4, and generally shown at 5 is the mold plug, movable toward and away from said mold die 4.

Specifically, the worktable 3 has a cylindrical socket 6 defined centrally therein in which there is detachably secured the mold die 4, advantageously in the form of a ring adapted to accommodate a respective pan 7 wherein a pizza bed is to be formed in a manner to be explained.

Secured fixedly on the base 2 are two cylindrical, rod-shaped uprights (bars) 8 which are stiffened upwardly by a plate-like crosspiece 9, the crosspiece 9 having a double-acting cylinder 10 attached thereto in a conventional way not shown which has a vertical axis coincident with the vertical axis of the die 4.

The rod 11 of said cylinder 10 is freely slidable through a clearance bore 9a in the crosspiece 9 and has a bottom end attached to a horizontal plate 12 at a central location thereon.

The horizontal plate 12 supports, via four studs 13, a pressure ring 14 having a selected thickness. This pressure ring 14 is coaxial with the cylinder 10 and is movable vertically along guides provided by the uprights 8 themselves. To this aim, the pressure ring 14 has an annular flange 15 attached thereto which has a suitable outside diameter and respective semi-circular recesses 16, 17 in sliding engagement with said uprights 8 at diametrically opposed locations.

Beneath the plate 12, a second horizontal plate 18 carries, through four studs 19, a pressure ring 20. This pressure ring 20 has the same thickness as pressure ring 14, inside which it fits coaxially and slidably in rubbing surface contact relationship.

Secured on the plate 18 is a double-acting cylinder 21 having a vertical axis coincident with the axis of cylinder 10. The rod 22 of this cylinder 21 has its free top end attached to the horizontal plate 12.

A third horizontal plate 23 supports, by means of four studs 24, a further pressure ring 25. This pressure ring 25 fits slidably within pressure ring 20 coaxially and in rubbing surface contact therewith.

Secured on the plate 23 is a double-acting cylinder 26 having a vertical axis and a rod 27 with its free top end attached to the horizontal plate 18.

A fourth, substantially annular pressure ring 28 fits slidably within pressure ring 25 coaxially and in rubbing surface contact therewith.

Within the pressure ring 28, there is defined a cylindrical chamber 29 closed at the top by a horizontal wall 30 of the pressure ring 28 and communicated at the bottom with the outside environment through a cylindrical passageway 31 extending coaxially with said pressure ring 28. The passageway 31 has a reduced diameter with respect to the chamber 29, in co-operation wherewith it defines an annular shoulder 29a.

Mounted to the wall 30 of pressure ring 28 is a double-acting cylinder 32 having a vertical axis coincident with the axis of cylinder 10 and a rod 33 with its top end attached to the horizontal crosspiece 23.

Guided for sliding movement within the cylindrical passageway 31 of pressure ring 28 is a last or central pressure ring 34 to the upper horizontal base whereof and internal of the chamber 29, there is mounted a vertical axis, double-acting cylinder 36. The rod 37 of this cylinder 36 has its top end attached to the wall 30 of pressure ring 28. On the central pressure ring 34, there is secured or otherwise formed an annular rim 34a having a larger diameter than the passageway 31. This annular rim 34a carries, attached thereto, the bottom ends of rotation-preventing rods 41, 42 and the downstroke limiters for the pressure rings 20, 25 and 28, extending a substantial length above the crosspiece 9 and being freely engaged through respective holes formed in the crosspieces 23, 18 and 12.

A cloth made of a non-sticking material which will not stick to bread-making dough and the like as used to form pizza beds, is secured peripherally on a ring 39, which is supported by the ring 15 of pressure ring 14 via plural springs 40. The cloth 38 is positioned beneath the plurality of pressure rings 14 to 34 just described and is sized to enclose them all.

The pressure rings 14, 20, 25, 28 and 34, fitting slidably and coaxially within one another in rubbing surface contact relationship, form the mold plug 5 for the press 1 of this invention. It can be finally observed, in relation to this plug, that it comprises a plurality of pressure rings (14, 20, 25, 28 and 34) having a circular cross-sectional shape and fitting in a guided fashion telescopically inside one another for movement from a retracted position where their bottom ends, facing toward the mold die 4, lie coplanarly and concentrically and form a single working wall 5a for said plug, to a second position where the pressure rings are individually drawn out of one another.

It should be further noted that, to perform such telescoping movements, each pressure ring can be individually driven by a respective cylinder or the like actuator. Understandably, the circular cross-section shape of said pressure rings is the most effective one, but other shapes may be used in cross-section to meet different production demands. Also, the means provided to drive the pressure rings may be hydraulic or mechanical.

The operation of the press according to this invention is as follows.

Figure 3:
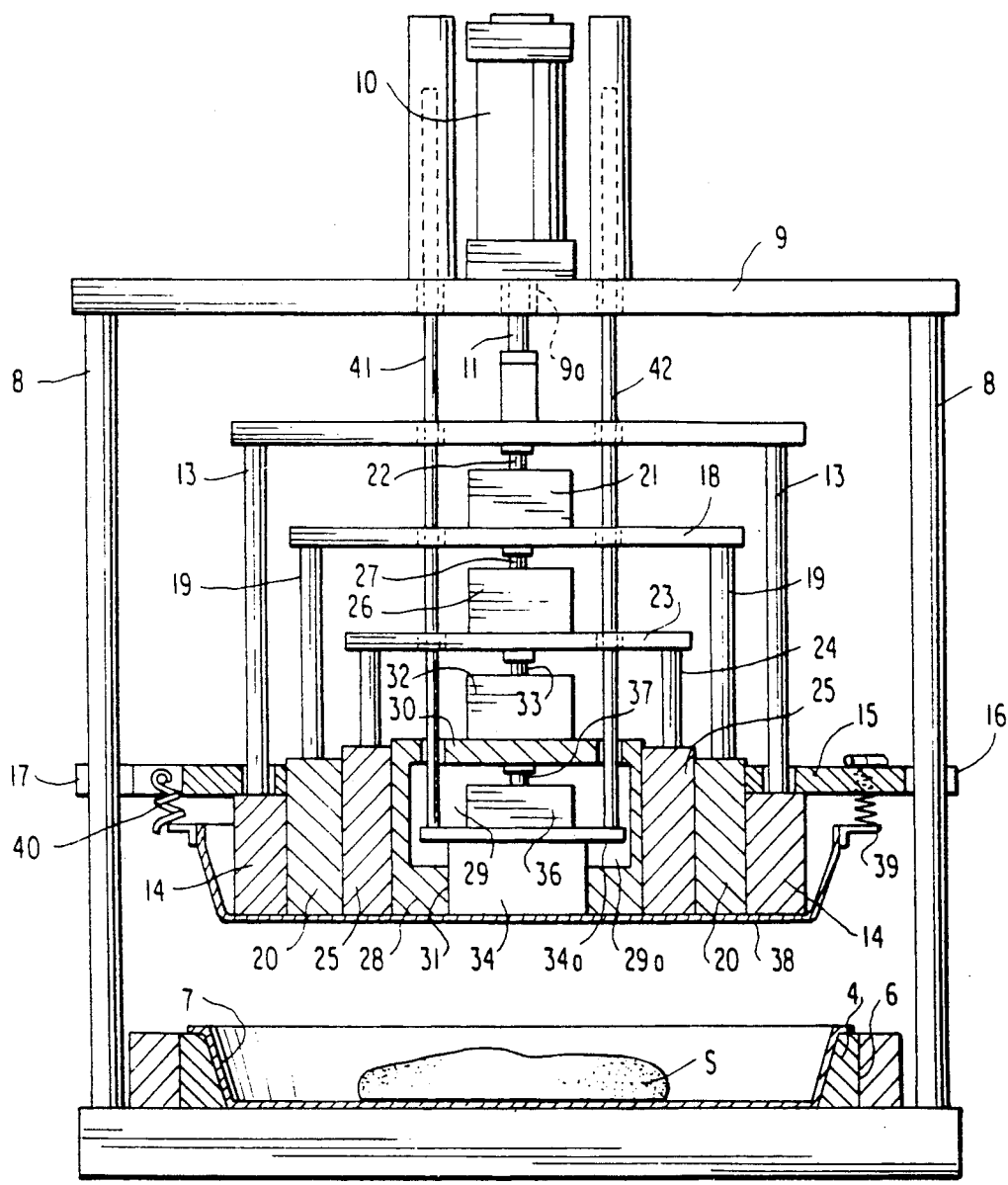
FIG. 3 is an elevation view in cross-section showing schematically the same press as in FIG. 1.

In a starting condition (FIGS. 1 and 3), the plug 5 would be in a raised position away from the die 4, and the bottom ends of the pressure rings 14–34 comprising it, that is their walls facing toward the die 4, would be in their retracted positions, that is be coplanar and concentrical into a single wall surface.

The die 4 is now accessible, and a pan 7 is positioned thereinto containing a preform S made of an edible dough.

Preferably, this preform would be in the form of a disk of substantial thickness.

Figure 4:
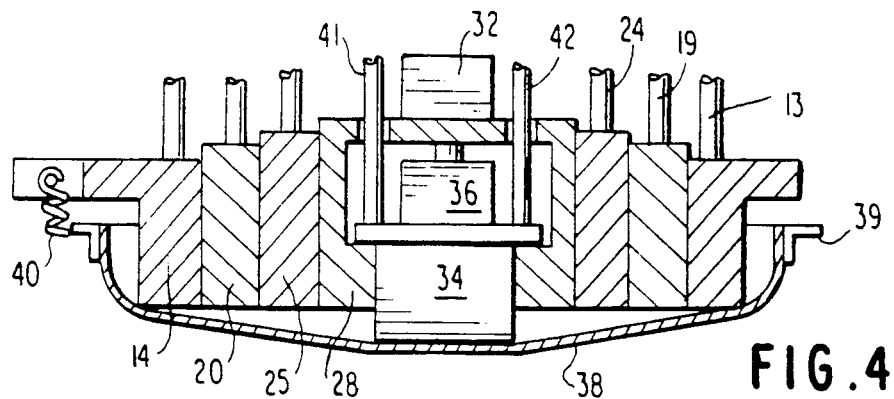
FIGS. 4 to 10 illustrate schematically different successive positions of the mold plug of the press in FIG. 1, at successive stages of its operation.

The press working cycle begins with a downward movement of the central pressure ring 34 brought about by operating its respective cylinder 36 (FIG. 4). On completion of this downward stroke, the annular flange 34a of pressure ring 34 will bear onto the annular shoulder 29a of the chamber defined in said pressure ring 28.

Figure 5:
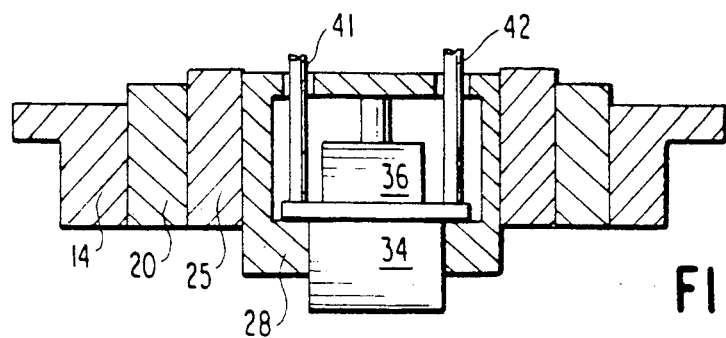

While keeping the cylinder 36 open to the source (not shown) of pressurized fluid, cylinder 32 is presently operated to drive down pressure ring 28 (along with the central pressure ring 34 made rigid therewith) relatively to pressure ring 25 (FIG. 5).

Figure 6:
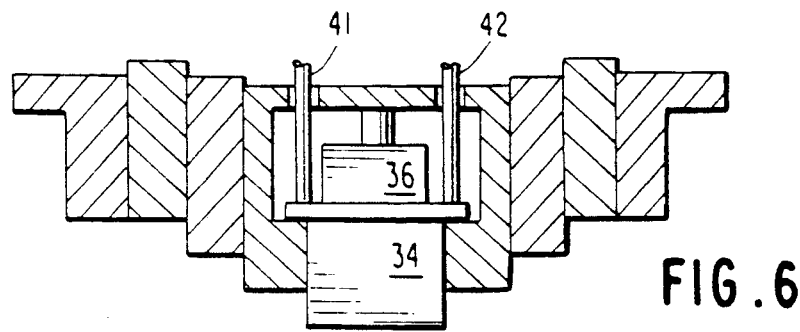

By similar operation of cylinders 26 and 21, a configuration is attained for the plug 5, as shown in FIG. 6, wherein pressure rings 34, 28 and 25 are moved down relatively to the outermost pressure ring 14, held in its original position. Briefly, with the above-described steps, the plug 5 has been extended telescopically.

At this stage, with all of the cylinders 36, 32, 26 and 21 kept open to the source of pressurized fluid, cylinder 10 is operated to drive down the whole plug 5, held rigidly in the above-mentioned configuration.

Figure 7:
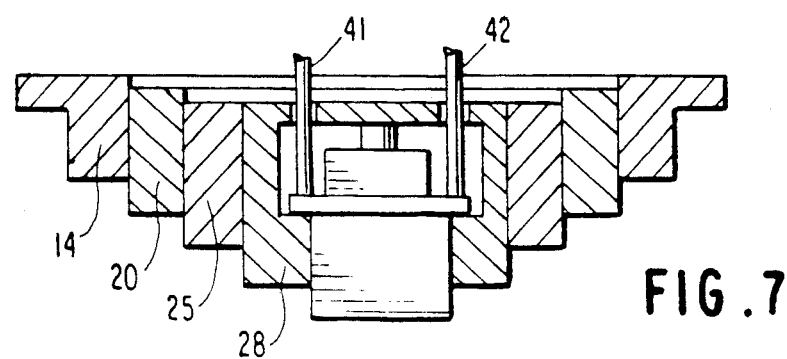

With this downward movement, the preform S will be first pressed by just the central pressure ring 34, and specifically, of that preform, substantially only the central portion is pressed which has the same surface area as the pressing surface area of the pressure ring 34 (FIG. 7).

During this initial compression step, whereas the central portion of the preform S is squeezed flat, and subjected to stretching and inherent stresses of a mechanical nature, the remainder of the preform is left "free" to flow radially outwards without undergoing any mechanical stressing during that movement. Further, this remainder of the preform dough can receive the carbon dioxide being released through the dough and gradually "squeezed out" by the pressure applied to the central portion thereof.

On completion of the central pressure ring 34 action, that is upon the cylinder 10 completing its partial downward stroke, while keeping this cylinder 10 open to the source of pressurized fluid, cylinder 36 is discharged to result in sequential descent of pressure rings 28, 25, 20 and 14 (made rigid with one another) relatively to the central pressure ring 34.

Figure 8:
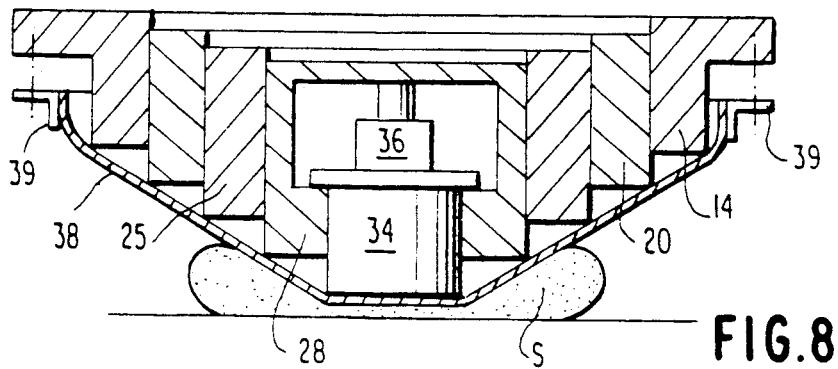

By virtue of this descent (FIG. 8), while the central portion of the preform S already pressed down and deformed by the central pressure ring 34 is held in the position thus achieved by the latter, a further portion of reduced thickness surrounding the previous one is progressively pressed down by pressure ring 28.

The above-discussed descent movement is brought to a stop on pressure ring 28 (FIG. 8) reaching the original position of alignment to the central pressure ring 34. The remainder of the preform S will have moved freely outwards without undergoing any mechanical stresses and received substantially all of the carbon dioxide from the squeezed dough under pressure rings 34 and 28.

By successively exhausting cylinders 32, 26 and 21, successive compressions are performed, one after another over increasingly more peripheral portions of the dough, to produce the same effects and achieve the same results as explained hereinabove.

Figure 9:
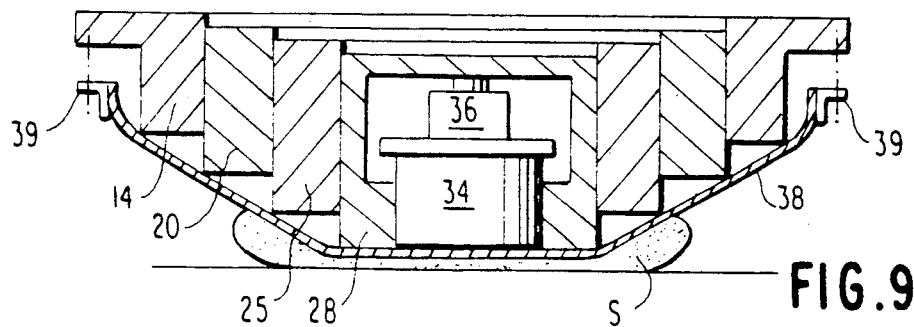

The operation ends on all the pressure rings 34–14 being returned to their original aligned state (FIG. 9). It matters to notice that during such steps of sequential compression of successive portions of the perform S, the cloth 38 is at all times present between the working parts of the pressure rings and the preform S. This is vital to proper operation of the machine, because it confers continuity on the compressive action and allows removal of the pizza bed product from the pressure rings at the end of the process.

Figure 10:
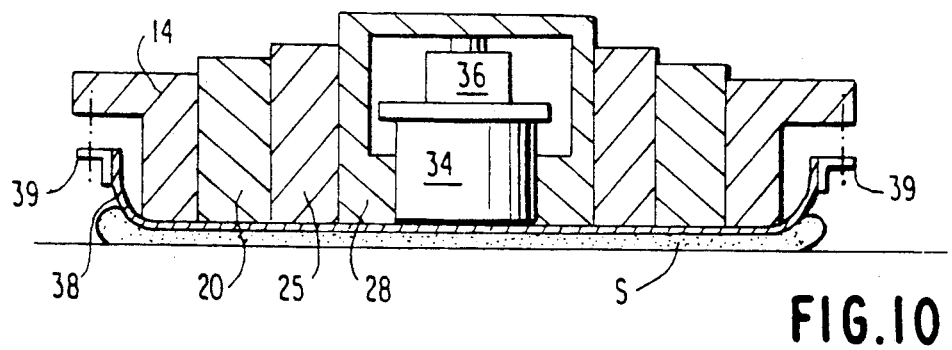
Figure 11:
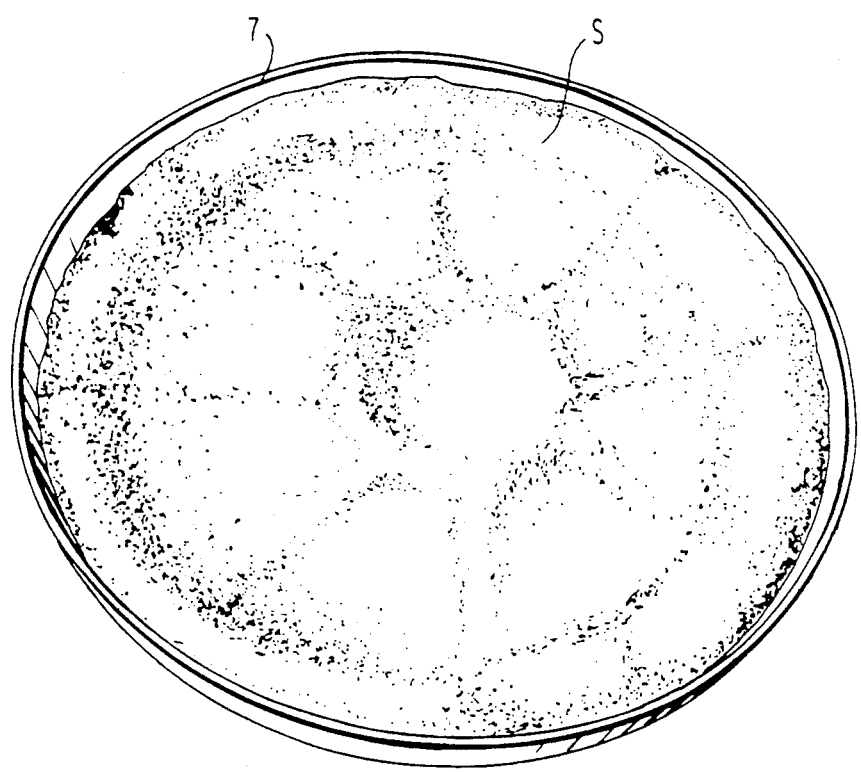
FIG. 11 shows in perspective a pizza bed as formed under the vertical press of this invention.

The process cycle is ended by controlling the pressure rings to move back upwards. For this purpose, cylinder 21 is first operated to lift up pressure ring 20, then cylinder 26 to drive pressure ring 25 upwards, then cylinder 32 and cylinder 36 to drive pressure rings 28 and 34 upwards, all relatively to the outermost pressure ring 14, which is held in the previously attained down position (FIG. 9). Finally, by operating cylinder 10, the outermost pressure ring 14 is also raised which will drag the cloth 38 therealong. From the die 4, presently made accessible, the pan 7 and its pizza bed can now be removed and passed on to further processing. Clearly noticeable in the resulting pizza bed (FIG. 10) is the thickened rim, whose dough has undergone no mechanical stresses and received most of the carbon dioxide generated in the original dough lump and progressively pushed outwards from the pizza bed during its forming process.

This pizza bed provides the basis for a genuine Neapolitan pizza recipe, which is organoleptically and visually comparable with those to be obtained by the traditional manual method.

What is claimed is:

1. A vertical press for making pizza beds comprising:
   a mold plug including a plurality of pressure rings being mounted to telescope inside one another in a guided fashion from a first position where bottom ends of said rings lie coplanar to each other and define a planar wall for said plug, to a second position where said rings are individually extended with respect to one another;
   means for driving said pressure rings individually in a vertical direction and
   a cloth of a non-sticking material which will not stick to the dough employed for pizza beds attached peripherally to an outermost pressure ring of said plug by spring-biased means and enclosing said plurality of pressure rings, wherein
   said means for driving the pressure rings individually comprise respective vertical axis, double-acting cylinders, each having a cylinder case attached to its respective pressure ring and a piston rod attached to a reaction wall of an outer adjacent pressure ring which guides sliding movement of an adjacent inner ring.

2. A vertical press according to claim 1, wherein said pressure rings are circular in cross-section and means are provided in said plug to prevent said pressure rings from rotating.

* * * * *